United States Patent [19]

Berner et al.

[11] 4,433,198
[45] Feb. 21, 1984

[54] DEVICE TO MEASURE TEMPERATURE OF AN ANNULAR ELASTOMERIC SEAL

[75] Inventors: William E. Berner, Englewood; Thomas H. Wical, Xenia, both of Ohio

[73] Assignee: The United States of America as represented by the Secretary of the Air Force, Washington, D.C.

[21] Appl. No.: 366,742

[22] Filed: Apr. 8, 1982

[51] Int. Cl.³ .......................................... H01L 35/02
[52] U.S. Cl. ..................................... 136/230; 136/221; 277/229; 374/141
[58] Field of Search ....................... 136/221, 230, 235; 374/141; 376/247; 277/229

[56] References Cited

U.S. PATENT DOCUMENTS

| 2,374,377 | 4/1945 | Percy | 136/4 |
| 2,779,810 | 1/1957 | Horbinski | 136/221 X |
| 3,054,397 | 9/1962 | Benzinger | 128/2 |
| 3,094,001 | 6/1963 | Woodcock et al. | 73/355 |
| 3,464,864 | 9/1969 | Rentz | 136/221 |
| 3,650,153 | 3/1972 | Schwab | 73/343 R |
| 4,156,533 | 5/1979 | Close et al. | 277/229 |
| 4,376,227 | 3/1983 | Hilborn | 136/230 X |

FOREIGN PATENT DOCUMENTS

| 56-104227 | 8/1981 | Japan | 374/141 |
| 495551 | 12/1975 | U.S.S.R. | 374/141 |

Primary Examiner—Leland A. Sebastian
Attorney, Agent, or Firm—Donald J. Singer; Bobby D. Scearce

[57] ABSTRACT

A device for measuring in situ the temperature of an annular elastomeric seal is provided which comprises, in a preferred embodiment thereof, an annular elastomeric seal formed of two annular halves, a thermocouple embedded in said seal near the interface of said annular halves, a sleeve having one end molded to one of said halves for supporting and protecting the thermocouple leads and for conducting said leads external of the housing or fixture incorporating said seal.

4 Claims, 4 Drawing Figures

DEVICE TO MEASURE TEMPERATURE OF AN ANNULAR ELASTOMERIC SEAL

RIGHTS OF THE GOVERNMENT

The invention described herein may be manufactured and used by or for the Government of the United States for all governmental purposes without the payment of any royalty.

BACKGROUND OF THE INVENTION

This invention relates generally to temperature measuring devices incorporating thermocouples, and more particularly to a novel device for measuring in situ the temperature of an annular elastomeric seal during reciprocating cyclic motion of an assembly incorporating the seal.

The present invention provides a novel annular elastomeric seal structure configured to measure the temperature of the seal during dynamic cycling at elevated temperature and pressure. The seal structure includes a thermocouple embedded into the body of the elastomer of which the seal is comprised, and a protective sleeve, one end of which is formed to the annulus of the seal for containing and supporting the lead wires for the thermocouple. The seal may be formed by pressure molding, in a modified mold, two annular preformed seal halves preceded by appropriate positioning of the thermocouple and protective sleeve. The configuration of the present invention may desirably include placement of the sleeve perpendicular to the plane of the seal annulus to facilitate positioning the sleeve within the housing or fixture containing the seal.

It is, therefore, an object of the present invention to provide a device to measure the temperature of an annular elastomeric seal under use conditions at elevated temperature and pressure.

It is a further object of the present invention to provide an annular elastomeric seal for which the temperature during use may be monitored.

These and other objects of the present invention will become apparent as the detailed description of representative embodiments thereof proceeds.

SUMMARY OF THE INVENTION

In accordance with the foregoing principles and objects of the present invention, a device for measuring in situ the temperature of an annular elastomeric seal is provided which comprises, in a preferred embodiment thereof, an annular elastomeric seal formed of two annular halves, a thermocouple embedded in said seal near the interface of said annular halves, a sleeve having one end molded to one of said halves for supporting and protecting the thermocouple leads and for conducting said leads external of the housing or fixtures incorporating said seal.

DESCRIPTION OF THE DRAWINGS

The present invention will be more clearly understood from the following detailed description of representative embodiments thereof read in conjunction with the accompanying drawings wherein.

DETAILED DESCRIPTION

Figure 1:
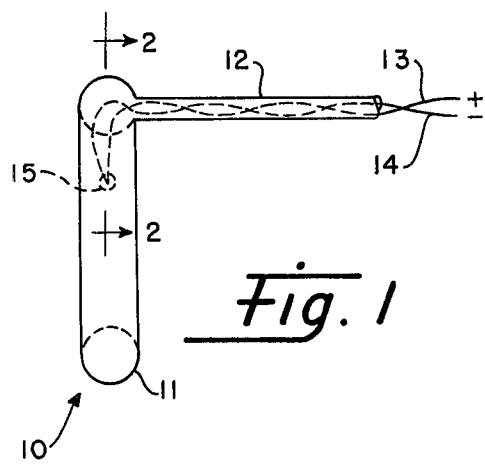
FIG. 1 is a side elevational view of the temperature measuring device of the present invention.

Referring now to the drawings, FIG. 1 shows a side elevational view of an annular elastomeric seal, stainless steel tube and thermocouple of which the invention herein is comprised.

The temperature measuring device 10 of the present invention may be configured to include, in a non-limiting embodiment as shown in the drawings, an elastomeric annular seal 11, such as an O-ring seal, having a protective sleeve 12 molded into the body of the seal 11 substantially as shown. Sleeve 12 encloses and provides a protective casing for thermocouple wires 13 and 14 which terminate within the body of seal 11 at thermocouple bead 15. Sleeve 12 may preferably be positioned perpendicular to the plane of seal 11 substantially as shown in the drawings to facilitate placement of the device 10 within a housing or fixture utilizing it.

Figure 2:
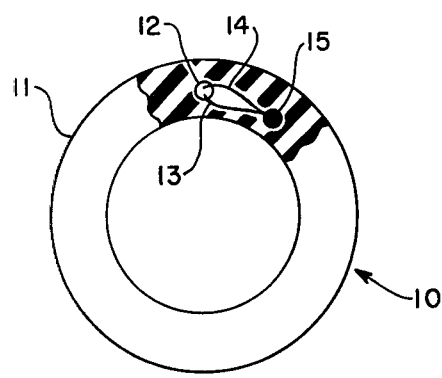
FIG. 2 is a front elevational view of the invention in partial cutaway to show placement of the thermocouple.

FIG. 2 is a front elevational view of the device 10 of FIG. 1 partially cutaway along lines 2—2. As shown therein, thermocouple bead 15 may conveniently be placed substantially in the center of the annulus comprising the seal 11.

Figure 3:
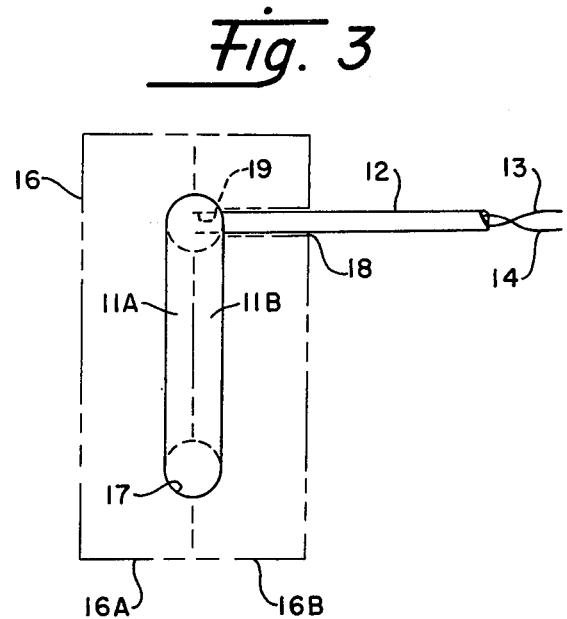
FIG. 3 shows schematically a mold for forming an embodiment of the invention.

Fabrication of the temperature measuring device 10 may be performed in a modified mold 16 such as shown schematically in FIG. 3. Mold 16 may comprise two mating mold sections 16A and 16B defining a cavity 17 wherein the annular seal 11 is formed and vulcanized. Mold section 16B includes a channel 18 therethrough, communicating with mold cavity 17 and sized for receiving a sleeve 12 for molding with seal 11. Seal 11 may be prepared in two annular preformed halves 11A and 11B. Annular preformed half 11B, having a hole 19 to receive sleeve 12, is placed in mold section 16B. Sleeve 12 is inserted through hole 18 of mold half 16B and hole 19 of preformed half 11B such that one end is disposed with the mold cavity 17 about half way. Sleeve 12 may have on the end thereof joining seal 11 an enlarged diametric or flared portion (not shown in the drawings) to provide a substantial joint between the sleeve 12 and seal 11 in the assembled condition. The thermocouple wires 13 and 14 are then threaded through sleeve 12 and thermocouple bead 15 is embedded into the exposed planar surface of preformed half 11B substantially as shown in FIG. 2. Preformed half 11A is then inserted and the 11A-11B assembly is then vuncanized under pressure within closed mold 16 to produce the assembled device 10 depicted in FIG. 1.

In a representative device 10 fabricated in demonstration of the invention herein, a sleeve 12 in the form of a two-inch (5 cm) length of 0.042 inch (0.107 cm) O.D. stainless steel tubing was inserted into a 0.045 inch (0.114 cm) hole 18 provided in the mold section 16B substantially as shown in FIG. 3. Sleeve 12 extended into the mold cavity 17 approximately 0.070 inch (0.178 cm). Thin walled stainless steel tubing was selected for use as the sleeve 12 as providing a suitable combination of flexible strength, workability and protection for the thermocouple wires, although other conventional tubular materials would be appropriate for use. A 0.005 inch (0.0127 cm) Type K chromel-alumel glass insulated thermocouple or Teflon coated iron-constantan thermocouple was inserted, and the fabrication completed as discussed above to produce device 10 including an O-ring having an outside diameter of 0.986±0.004 inch (2.50±0.102 cm) and an inside diameter of 0.708±0.004 inch (1.79±0.102 cm) (standard size 214).

Numerous demonstration seal devices 10 of the configuration just described were tested in a hydraulic seal test facility (not shown in the drawings) to determine the reliability of the configuration. The facility comprised two test cells in which seals were evaluated simultaneously. Test rods were driven through the cells using a two horsepower drive motor and variable speed gearbox. Cycling rates would be varied from 0.5 Hz to 1.0 Hz, and stroke lengths of 0.4 to 4.0 inches (1.02 cm to 10.2 cm). Test temperature was maintained by two strip heaters inside an adjacent oven unit. Hydraulic fluid test pressures were generated with an air/oil boost pump operatively connected to the test cells.

Preliminary tests of the demonstration seals 10 were performed at room temperature with cycling over a 4.0 inch (10.2 cm) stroke at a frequency of 1.0 Hz. The system pressure was pulsed from 0 to about 3000 psi and was synchronized with the stroking action. The pressure was held at the maximum 3000 psi for one complete cycle and then reduced to zero for the following cycle. A cycle consists of a forward and return stroke of the rod through the test cell with a total distance traveled of 8.0 inches (20.4 cm). The preliminary tests were generally successful in demonstrating the effectiveness and durability of the novel instrumented seal 10 of the present invention.

In a second series of tests, thermocouple instrumented seals 10 were prepared using three different non-limiting elastomeric materials; Nitrile, Fluorinated Hydrocarbon, and Phosphonitrilic. Seals 10 of each material were tested at three different sets of pressure test conditions each at fluid temperatures at room temperature, 93° C. and 135° C.:

Test Condition A: Fluid pressure: 0 to 3000 psi; rod stroke length: 4.0 inches (10.2 cm); stroke frequency: 1.0 Hz;

Test Condition B: Fluid pressure: 0 to 200 psi, stroke length: 4.0 inches; frequency: 1.0 Hz;

Test Condition C: Fluid pressure: 0 to 3000 psi; frequency: 1.0 Hz.

Test Condition A was designed to monitor seal temperatures as a function of cyclic rod motion and pulsating high pressure. Condition B was designed to determine the change in seal temperature at a lower system pressure, wherein the fluid pressure was pulsed 0 to 200 psi and synchronized with the rod motion. Condition C was designed to determine the effect of pressure induced seal heating due to material hysteresis, wherein pressures were pulsed 0 to 3000 psi at a frequency of 1.0 Hz without rod motion. Each seal was subjected to 1000 cycle tests, and the ambient temperature, seal temperature, and fluid temperature were monitored throughout the testing.

Figure 4:
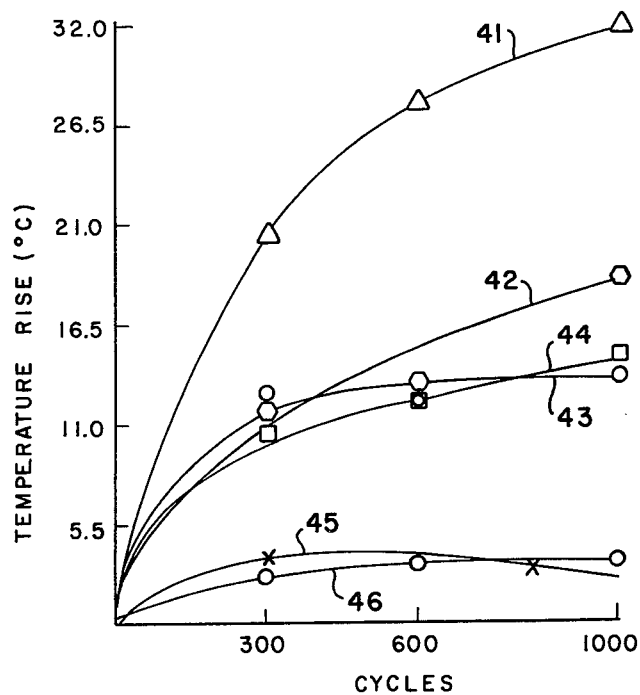
FIG. 4 is a graphical presentation of test results for various elastomeric seals tested under dynamic cycling at elevated temperatures.

A summary of the comparative test results under test conditions A for the nitrile, fluorocarbon, and phosphonitrilic seals for fluid temperatures of 135° C. and 93° C. are presented in FIG. 4. Curves 41 and 42 are for the nitrile seals at 135° C. and 93° C., respectively. Likewise, curves 43 and 44 present the results for the fluorocarbon seals at 135° C. and 93° C., respectively, and curves 45 and 46 present the respective results for the phosphonitrilic seals.

NITRILE SEALS

The preliminary tests of a nitrile instrumented seal were performed at room temperature with cycling over a 4.0 inch (10.2 cm) stroke at 1.0 Hz for 5000 continuous cycles. The internal seal temperature during that cycling period increased from 22° C. to 27.5° C. The internal seal temperature was observed to rise and fall at the same frequency as the pulsating pressure. In over 300 cycles of operation, a net increase in the internal seal temperature of 1.7° C. was observed.

Nitrile seals tested under test Condition A showed that a significant increase in internal seal temperature occurs as a result of rod motion and pressure cycling. As shown in FIG. 4, curve 41, at 135° C. the internal seal temperature rose 33.5° C. above the fluid temperature in 1000 cycles. At 93° C. (curve 42) the temperature differential was 20° C. after 1000 cycles. Room temperature cycling also increased internal seal temperature, but only 3.9° C. in 1000 cycles.

At 135° C. under test Condition B the internal nitrile seal temperature rise was approximately one half that recorded under Condition A. As the fluid temperature was reduced to 93° C. the magnitude of the seal temperature rise was also reduced. At room temperature the internal seal temperature was nearly the same as the fluid temperature after 1000 cycles.

Test Condition C involved only pressure pulsing. With each pressure pulse from 0 to 3000 psi, the internal seal temperature was observed to rise and fall with pressurization. Only slight net changes in temperature were recorded as a result of the pressure pulsing. At 135° C., a 3° C. increase in seal temperature was observed. At 93° C. a slight decrease in seal temperature was observed, and at room temperature the seal temperature remained about the same as the fluid temperature.

FLUOROCARBON SEALS

As shown in FIG. 4, results for the fluorocarbon seal at 135° C. (curve 43) and 93° C. (curve 44) under cyclic Condition A, showed that the internal seal temperature rose sharply over the first 300 cycles and then leveled off at approximately 14° C. above the fluid temperature. At room temperature, the internal seal temperature remained at about the fluid temperature over the initial 600 cycles and then increased over the last 400 cycles to about 6° C. above the fluid temperature.

Under test Condition B, the fluorocarbon internal seal temperature rose 9° C. over a fluid temperature of 128° C. after 1000 dynamic cycles. Seal temperature rise behaved as before but rose only to approximately one half that observed in Condition A. At 93° C. the seal temperature behavior under Condition B was about the same as that under Condition A. After 1000 cycles the seal temperature rose approximately 70% of that observed under Condition A. The room temperature cycling data showed that the seal temperature rose 8° C. after 1000 cycles.

The tests on fluorocarbon seals under Condition C at the three test temperatures indicated substantially no increase in internal seal temperature due to pressure pulsing. At 135° C. and at 93° C. a slight decrease in internal seal temperature was observed after 1000 pressure cycles.

PHOSPHONITRILIC SEALS

The Phosphonitrilic seal tests indicated only a slight increase in seal temperature due to dynamic cycling. A maximum seal temperature rise of 5.6° C. was observed during room temperature cycling. At 135° C. (FIG. 4, curve 45) the temperature rise was only 2.4° C. Under test Condition B the seal temperature decreased slightly after 1000 cycles.

The test results on the demonstration devices 10 as given herein show that the device of the present invention may be employed to monitor seal temperature increases under conditions of dynamic cycling and pulsating fluid pressure. Further, the device provided the desired sealing and demonstrated substantially immediate temperature response.

The present invention, as hereinabove described, therefore provides a novel device to measure the temperature in situ of an elastomeric annular seal. It is understood that certain modifications to the invention as hereinabove described may be made with respect to structure, materials and fabrication parameters, as might occur to one with skill in the field of this invention. Therefore, all embodiments contemplated hereunder have not been shown in complete detail. Other embodiments may be developed without departing from the spirit of this invention or from the scope of the appended claims.

We claim:

1. An improved reciprocating seal, including an annular elastomeric seal in combination with a device for measuring the temperature of said annular elastomeric seal, which comprises:
   a. a thermocouple, having a pair of electrically conducting wires connected thereto, embedded within and near the center of the annular body of said elastomeric seal; and
   b. a sleeve having a first end thereof terminating within and molded to said elastomeric seal near said thermocouple, said sleeve enclosing said conducting wires.

2. The seal as recited in claim 1 further comprising an enlarged diametric portion of said sleeve at said first end, said enlarged diametric portion molded within said elastomeric seal for firmly attaching said sleeve to said elastomeric seal.

3. The seal as recited in claim 1 wherein said first end of said sleeve is molded to said elastomeric seal substantially perpendicular to the plane of the annulus comprising said elastomeric seal.

4. The seal as recited in claim 1 wherein said annular elastomeric seal is formed of two annular halves with said thermocouple embedded at the interface of said annular halves, and said first end of said sleeve is molded to one of said annular halves.

* * * * *